(12) United States Patent
Zhao

(10) Patent No.: US 10,910,913 B2
(45) Date of Patent: Feb. 2, 2021

(54) MECHANISM FOR DISENGAGING HUB FROM OUTPUT SHAFT OF MOTOR

(71) Applicant: ZHEJIANG LINIX MOTOR CO., LTD, Dongyang (CN)

(72) Inventor: Haiqiang Zhao, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 222 days.

(21) Appl. No.: 16/149,127

(22) Filed: Dec. 26, 2018

(65) Prior Publication Data
US 2020/0021165 A1    Jan. 16, 2020

(30) Foreign Application Priority Data
Jul. 11, 2018    (CN) .......................... 2018 1 0754953

(51) Int. Cl.
*H02K 7/00* (2006.01)
*F16D 1/10* (2006.01)
*F16D 1/108* (2006.01)

(52) U.S. Cl.
CPC ............. *H02K 7/003* (2013.01); *F16D 1/101* (2013.01); *F16D 1/108* (2013.01)

(58) Field of Classification Search
CPC ........ H02K 7/003; H02K 7/006; F16D 1/101; F16D 1/108
See application file for complete search history.

(56) References Cited

U.S. PATENT DOCUMENTS

| | | | |
|---|---|---|---|
| 2010/0236529 A1* | 9/2010 | Schoetz | F02M 59/445 123/495 |
| 2015/0295456 A1* | 10/2015 | Michaelides | H02K 21/16 310/156.01 |
| 2019/0245404 A1* | 8/2019 | Hamana | H02K 3/345 |
| 2019/0383329 A1* | 12/2019 | Colavincenzo | F02B 67/06 |

* cited by examiner

*Primary Examiner* — Zakaria Elahmadi
(74) *Attorney, Agent, or Firm* — Jiwen Chen; Jacobson Holman PLLC

(57) ABSTRACT

An object of the present invention is to provide a mechanism for disengaging a hub from an output shaft of a motor, which is convenient to propel the scooter/wheelchair manually. For this purpose, the present invention employs the following technical solution. The present invention discloses a mechanism for disengaging a hub from an output shaft of a motor; an output end of the output shaft is extended out of the motor; a coupling is fixedly sheathed on the output end of the output shaft; a hub, a movable sleeve and a compression spring are sheathed on the coupling; a stopper is fixed at an end of the output end of the output shaft; the compression spring is limited between the stopper and the movable sleeve; the hub has a central hub hole by which the hub is sheathed on the coupling; a plurality of first positioning grooves, which are arranged circularly and uniformly spaced apart from each other, are formed on an inner edge of the hub; a coupling bulge is provided in the circumference of the coupling, and a plurality of second positioning grooves, which are arranged circularly and uniformly spaced apart from each other, are formed on the coupling bulge; a plurality of first positioning bulges, which are arranged circularly and uniformly spaced apart from each other, are provided on the movable sleeve.

13 Claims, 3 Drawing Sheets

MECHANISM FOR DISENGAGING HUB FROM OUTPUT SHAFT OF MOTOR

This application claims the priority benefit of Chinese Application No. 201810754953.5, filed Jul. 11, 2018 in Chinese, which is hereby incorporated by reference.

TECHNICAL FIELD OF THE INVENTION

The present invention relates to a gear motor for scooters or wheelchairs, and in particular to a mechanism for disengaging a hub from an output shaft of a motor.

BACKGROUND OF THE INVENTION

In an existing electric wheelchair or electric scooter, the hub is fixed on the output shaft of the gear motor, and the gear motor comprises a DC motor and a reduction gearbox. When the scooter or wheelchair is propelled manually, the gear motor is not powered on. However, since the rotation of the hub will drive the output shaft of the motor to rotate and also drive the gear in the reduction gearbox to rotate, the DC motor will be in the power generation state and there is resistance against the rotation of the output shaft. It will take great effort to propel the scooter/wheelchair manually.

SUMMARY OF THE INVENTION

An object of the present invention is to provide a mechanism for disengaging a hub from an output shaft of a motor, which is convenient to propel the scooter/wheelchair manually.

For this purpose, the present invention employs the following technical solution. The present invention discloses a mechanism for disengaging a hub from an output shaft of a motor; an output end of the output shaft is extended out of the motor; a coupling is fixedly sheathed on the output end of the output shaft; a hub, a movable sleeve and a compression spring are sheathed on the coupling; a stopper is fixed at an end of the output end of the output shaft; the compression spring is limited between the stopper and the movable sleeve; the hub has a central hub hole by which the hub is sheathed on the coupling; a plurality of first positioning grooves, which are arranged circularly and uniformly spaced apart from each other, are formed on an inner edge of the hub; a coupling bulge is provided in the circumference of the coupling, and a plurality of second positioning grooves, which are arranged circularly and uniformly spaced apart from each other, are formed on the coupling bulge; a plurality of first positioning bulges, which are arranged circularly and uniformly spaced apart from each other, are provided on the movable sleeve; when the hub is sheathed on the coupling, an axial end face, which is close to the side of the stopper, of the coupling bulge is on an outer side of the central hub hole; when the hub is rotated to correspond the first positioning grooves and the second positioning grooves one by one and to communicate the first positioning grooves with the second positioning grooves, due to the compression spring, the first positioning bulges on the movable sleeve are clamped in the first positioning grooves and the second positioning grooves; and when the first positioning bulges on the movable sleeve come into contact with the axial end face of the coupling bulge, a gap is formed between the first positioning bulges and the inner edge of the hub.

When it is necessary to propel the scooter/wheelchair manually, the movable sleeve is pulled outward to offset the elasticity of the compression spring by an external force, and after the first positioning bulges on the movable sleeve are moved from the first positioning grooves and the second positioning grooves. The hub is disengaged from the coupling, that is, the hub is disengaged from the output shaft. Then, the movable sleeve is rotated so that the first positioning bulges are deviated from the second positioning grooves, and the force applied to the movable sleeve is released. Now, due to the compression spring, the movable sleeve moves toward the coupling bulge so that the first positioning bulges on the movable sleeve are pressed on the axial face of the coupling bulge, and the position of the movable sleeve is thus maintained. Since the end face, which is close to the movable sleeve, of the coupling bulge is located on the outer side of the central hole, a gap will be formed between the first positioning bulges and the inner edge of the hub. That is, the movable sleeve will not come into contact with the hub. Therefore, the rotation of the hub is not limited, so it is convenient to propel the scooter/wheelchair manually. It is easier to propel the scooter or wheelchair. The mechanism of the present invention can disengage the hub from the output shaft, so that the rotation of the hub will not drive the output shaft to rotate and the output shaft will not rotate to result in damping. Therefore, the rotation of the hub is easier.

When it is necessary to drive the scooter/wheelchair, the hub is rotated so that each of the first positioning grooves is communicated with one second positioning groove. A force is applied to the movable sleeve so that the first positioning bulges on the movable sleeve are aligned with the first positioning bulges and the second positioning bulges; then, the force is released, and due to the compression spring, the first positioning bulges on the movable sleeve are clamped in the first positioning grooves and the second positioning grooves; when the output shaft rotates, the output shaft drives the coupling to rotate, the walls of the second positioning grooves are resisted against the first positioning bulges to drive the first positioning bulges to rotate, and then the first positioning bulges are resisted against the walls of the first positioning grooves to realize linkage of the output shaft and the hub.

Preferably, each of the first positioning bulges comprises an internal segment fitted with the first positioning grooves and an external segment fitted with the second positioning grooves, and a second positioning bulge is provided on an axial end face of the external segment of the first positioning bulge; and third positioning grooves fitted with the second positioning bulges are formed on the coupling bulge of the coupling, and each of the third positioning grooves is located between two adjacent second positioning grooves. The second positioning bulges and the third positioning grooves are arranged to position the movable sleeve, in order to prevent the movable sleeve from sliding to clamp the first positioning bulges in the first positioning grooves, to prevent the hub from getting stuck during its rotation, and to avoid any damage to the movable sleeve.

Preferably, the axial end face of the output end of the output shaft is recessed inward to form a fixation hole, a threaded end of a fixation screw is fitted in the fixation hole by threads, and the fixation hole, the fixation screw and the output shaft are arranged coaxially; and the stopper is sheathed on the fixation screw, and the stopper is limited between the axial end face of the output shaft and a head of the fixation screw. The arrangement of the fixation screw facilitates the arrangement of the stopper. The stopper is fixed by tightening the fixation screw.

Preferably, the coupling is fitted with the output shaft by a key. The output end of the output shaft comprises a thick segment and a thin segment to form a stepped structure. The fixation hole is formed on the thin segment and the coupling is sheathed on the thin segment. A keyway is formed on each of the thin segment and the coupling; and the coupling is limited between the stopper and the thick segment of the output shaft.

Such an arrangement facilitates the fixation of the coupling. The coupling is limited circumferentially by the combination of a conventional key and the output shaft. The coupling is limited axially by limiting the coupling between the stepped face of the output shaft and the stopper.

Preferably, the hub comprises a hub body and a hub holder; the hub body is fixed on the hub holder by a fastener; the hub holder comprises a first holder portion sheathed on the coupling and a second holder portion on the first holder portion; a process hole for fitting with the fastener is formed on each of the second holder portion and the hub body; the central hub hole is formed on the first holder portion; a through hole for allowing the first holder portion to pass through is formed on the hub body; the first positioning grooves are arranged on an axial face of the first holder portion; a retainer ring is provided on the output shaft or the coupling; and the hub holder is limited between the retainer ring and the movable sleeve. The hub body may be replaced with a new hub body to adapt to different types of tires. Meanwhile, the arrangement of the hub holder facilitates the overall assembly.

Preferably, the second holder portion is formed at an end of the first holder portion away from the motor, and the hub body is located between the second holder portion and the motor. Such an arrangement is designed to reduce the transverse distance on the scooter/wheelchair, in order to reduce the overall size.

Preferably, the central hub hole comprises a first central hole segment and a second central hole segment, and the first central hole segment has a diameter greater than that of the second central hole segment; and when the hub is sheathed on the coupling, the coupling is fitted in the second central hole segment, and the coupling bulge of the coupling is located in the first central hole segment. With such an arrangement, the axial position of the hub is limited by the coupling bulge.

Preferably, a circular fitting bulge is formed on an inner edge of an axial end face, which is close to the movable sleeve, of the hub; the first positioning grooves are arranged on the fitting bulge, and the first positioning grooves run through a circumferential outer wall and a circumferential inner wall of the fitting bulge; and when the first positioning bulges are resisted against the axial end face of the coupling bulge, a gap is formed between the first positioning bulges and the axial end face of the fitting bulge.

With such an arrangement, the processing of the first positioning bulges on the movable sleeve is facilitated, and the first positioning bulges can be longer. The axial end face, which is close to the side of the stopper, of the coupling bulge gets closer to the stopper than the axial end face of the fitting bulge, so that the movable sleeve will not come into contact with the hub when the hub is disengaged from the output shaft.

Preferably, a convex bulge, which is extended towards a circumferential outer side, is formed at an end, which is away from the first positioning bulges, of the movable sleeve; an inner wall of the movable sleeve is extended outward to form a first escape groove which gives the way to the compression spring, and the first escape groove runs through an end, having the convex bulge, of the movable sleeve; an end, which is away from the movable sleeve, of the stopper is extended towards the circumferential outer side to form a convex ring; one end of the compression spring is located in the first escape groove and the other end of the compression spring is resisted against an axial end face of the convex ring.

With such an arrangement, a longer compression spring can be used to ensure the fixation position of the movable sleeve, in order to ensure the stability of the scooter/wheelchair when in use. One end of the compression spring is sheathed on the coupling and resisted against the groove wall in the movable sleeve, and the other end of the compression spring is sheathed on the stopper and resisted against the axial end face of the convex ring. With such an arrangement, the positioning of the compression spring is facilitated, and meanwhile, the stopper can be smaller so that the size of the scooter/wheelchair can be small.

Preferably, the coupling comprises a coupling body; the coupling bulge comprises a plurality of individual coupling bulges, which are arranged circularly and uniformly spaced apart from each other on the circumferential outer side of the coupling body; the second positioning grooves are located between two adjacent individual coupling bulges; when the hub is sheathed on the coupling body, an axial end face, which is close to the side of the stopper, of the individual coupling bulge is located on an axial side of an axial face of the inner edge of the hub; and an oil tank is provided on the coupling body, and the oil tank comprises circular tanks on two sides and a spiral groove between the two circular tanks.

The arrangement of the individual coupling bugles facilitates the production of the coupling, the arrangement of the oil tank facilitates the rotation of the hub, and the arrangement of the oil tank structure can ensure better storage of the lubricant.

The present invention can disengage the hub from the output shaft, which is convenient to propel the scooter/wheelchair manually.

DETAILED DESCRIPTION OF THE INVENTION

The present invention will be further described below by specific embodiments with reference to accompanying drawings.

Figure 1:
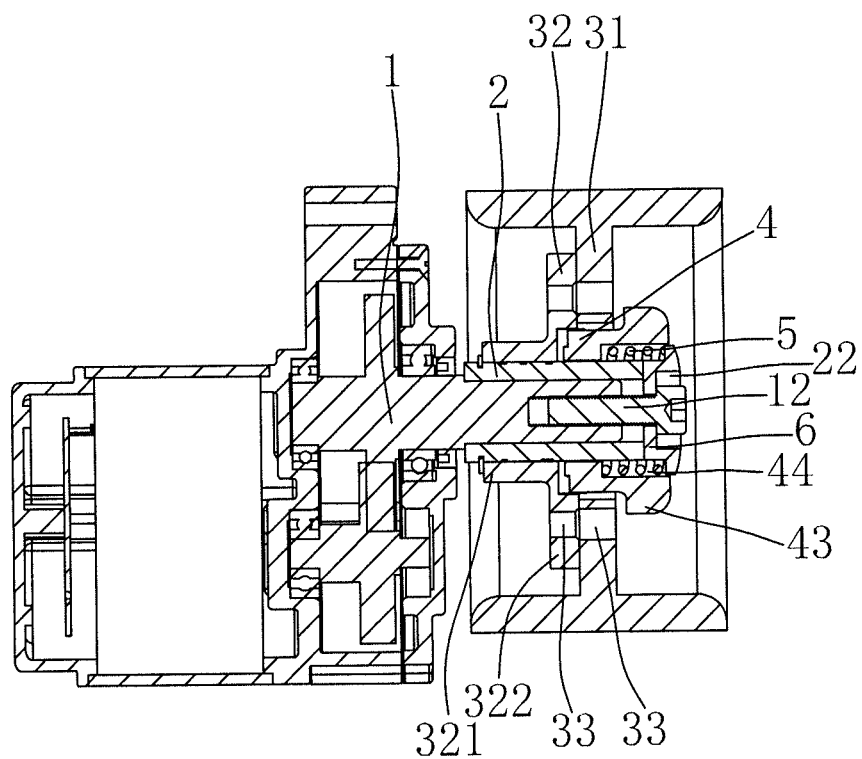
FIG. 1 is a sectional view of the present invention.
Figure 2:
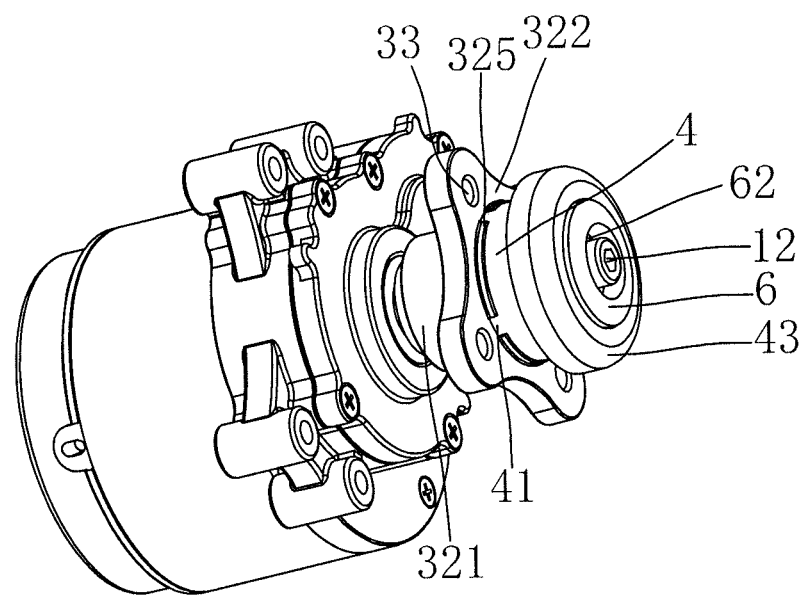
FIG. 2 is a structural diagram of the present invention, when the hub is disengaged from the output shaft.
Figure 3:
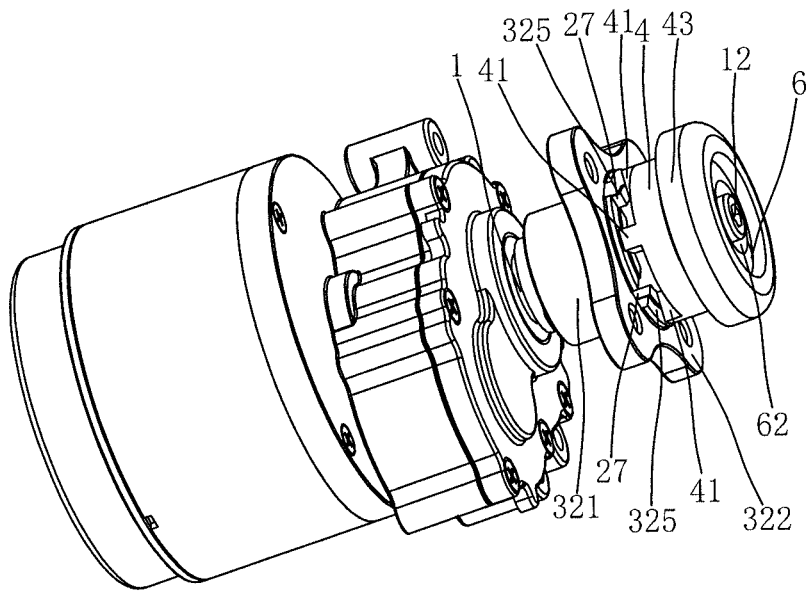
FIG. 3 is a structural diagram of the present invention, when the hub is linked with the output shaft.
Figure 4:
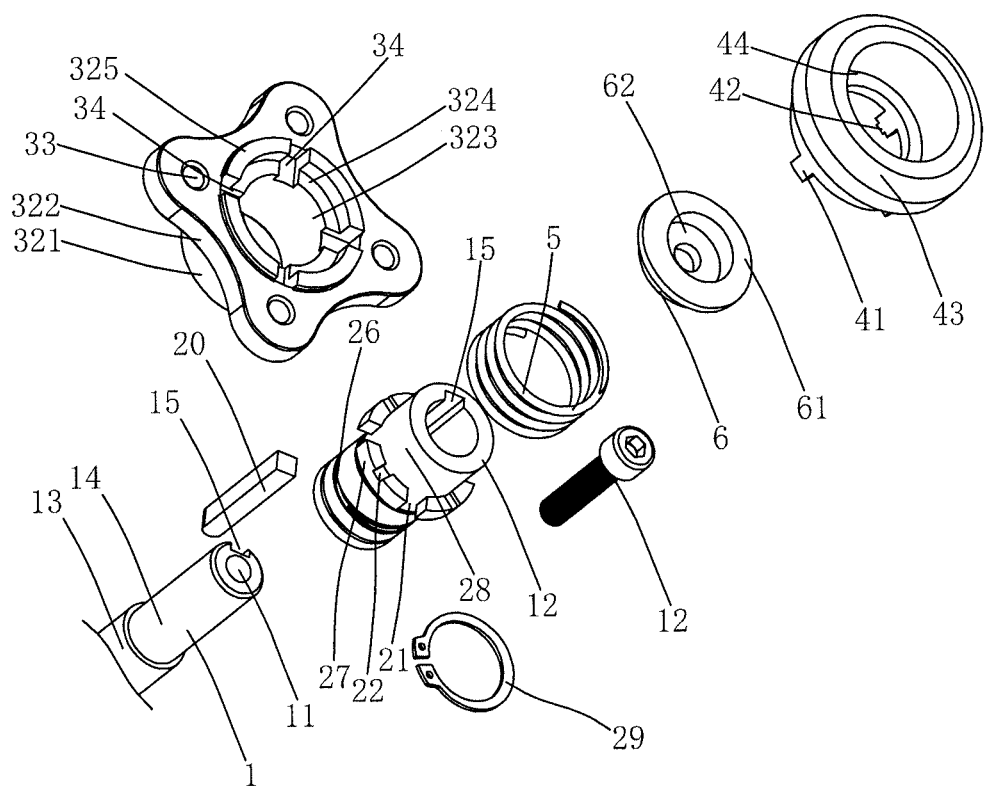
FIG. 4 is an exploded view of the present invention.
Figure 5:
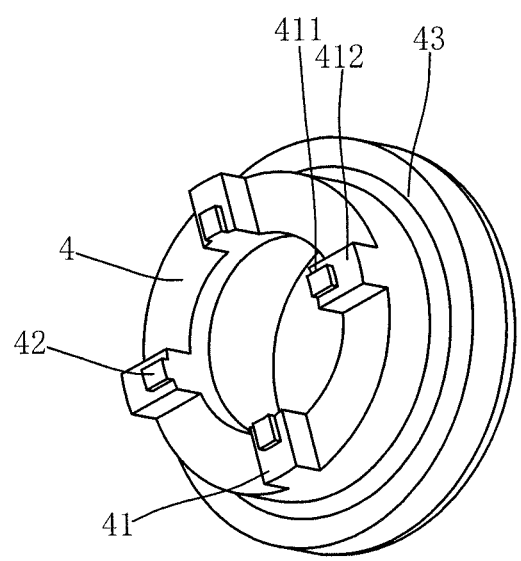
FIG. 5 is a structural diagram of a movable sleeve of the present invention.

Referring to FIG. 1 to FIG. 5, the present invention provides a mechanism for disengaging a hub from an output shaft of a motor; an output end of the output shaft 1 is extended out of the motor; a coupling 2 is fixedly sheathed on the output end of the output shaft 1; a hub, a movable sleeve 4 and a compression spring 5 are sheathed on the coupling 2; a stopper 6 is fixed at an end of the output end of the output shaft 1; and the compression spring 5 is limited between the stopper 6 and the movable sleeve 4.

The hub comprises a hub body 31 and a hub holder 32. A tire (not shown) is fixed on the hub body 31. The hub body 31 is fixed on the hub holder 32 by a fastener. The hub holder 32 comprises a first holder portion 321 sheathed on the coupling 2 and a second holder portion 322 on the first holder portion. A process hole 33 for fitting with the fastener is formed on each of the second holder portion 322 and the hub body 31. The first holder portion 321 has a central hub hole by which the hub is sheathed on the coupling 2, and the hub body 31 has a through hole for allowing the first holder portion 321 to pass through. The second holder portion 322 is formed at an end of the first holder portion 321 away from the motor, and the hub body 31 is located between the second holder portion 322 and the motor.

A plurality of first positioning grooves 34, which are arranged circularly and uniformly spaced apart from each other, are formed on an inner edge of the axial face, which is close to the side of the stopper, of the first holder portion 321 of the hub holder 32; a coupling bulge is provided in the circumference of the coupling 2, and a plurality of second positioning grooves 21, which are arranged circularly and uniformly spaced apart from each other, are formed on the coupling bulge; a plurality of first positioning bulges 41, which are arranged circularly and uniformly spaced apart from each other, are provided on the movable sleeve 4; and when the hub is sheathed on the coupling 2, an axial end face, which is close to the side of the stopper 6, of the coupling bulge is on an outer side of the central hub hole. When the hub is rotated to correspond the first positioning grooves 34 and the second positioning grooves 21 one by one and to communicate the first positioning grooves 34 with the second positioning grooves 21, due to the compression spring 5, the first positioning bulges 41 on the movable sleeve 4 are clamped in the first positioning grooves and the second positioning grooves; and when the first positioning bulges 41 on the movable sleeve 4 come into contact with the axial end face of the coupling bulge, a gap is formed between the first positioning bulges 41 and the first holder portion 321 of the hub holder.

The central hub hole comprises a first central hole segment 323 and a second central hole segment 324, and the first central hole segment 323 has a diameter greater than that of the second central hole segment 324; and when the hub holder 32 is sheathed on the coupling 2, the coupling 2 is fitted in the second central hole segment 324, and the coupling bulge of the coupling 2 is located in the first central hole segment 323. A circular fitting bulge 325 is formed on an inner edge of an axial end face, which is close to the stopper, of the first holder portion 321 of the hub holder 32; the first positioning grooves 34 are arranged on the fitting bulge 325, and the first positioning grooves 34 run through a circumferential outer wall and a circumferential inner wall of the fitting bulge 325; and when the first positioning bulges 41 are resisted against the axial end face of the coupling bulge, a gap is formed between the first positioning bulges 41 and the axial end face of the fitting bulge 325.

Each of the first positioning bulges 41 comprises an internal segment 411 fitted with the first positioning grooves and an external segment 412 fitted with the second positioning grooves, and a second positioning bulge 42 is provided on an axial end face of the external segment 412 of the first positioning bulge 41; and third positioning grooves 22 fitted with the second positioning bulges 42 are formed on the coupling bulge of the coupling 2, and each of the third positioning grooves 22 is located between two adjacent second positioning grooves 21.

The coupling 2 comprises a coupling body 28; the coupling bulge comprises a plurality of individual coupling bulges 27, which are arranged circularly and uniformly spaced apart from each other on the circumferential outer side of the coupling body 28; the second positioning grooves 21 are located between two adjacent individual coupling bulges 27; and the third positioning grooves 22 are arranged on the individual coupling bulges 27. When the hub holder 32 is sheathed on the coupling body 28, an axial end face, which is close to the side of the stopper 6, of the individual coupling bulge 27 is located on an axial side of an axial face of the inner edge of the first hub holder 321 of the hub holder; and an oil tank 26 is provided on the coupling body 27, and the oil tank 26 comprises circular tanks on two sides and a spiral groove between the two circular tanks. A retainer ring 29 is provided on the coupling 2; and the hub holder 32 is limited between the retainer ring 29 and the movable sleeve 4.

The axial end face of the output end of the output shaft 1 is recessed inward to form a fixation hole 11, a threaded end of a fixation screw 12 is fitted in the fixation hole 11 by threads, and the fixation hole 11, the fixation screw 12 and the output shaft 1 are arranged coaxially; and the stopper 6 is sheathed on the fixation screw 12, and the stopper 6 is limited between the axial end face of the output shaft 1 and a head of the fixation screw 12.

The coupling 2 is fitted with the output shaft 1 by a key 20; the output end of the output shaft 1 comprises a thick segment 13 and a thin segment 14 to form a stepped structure; the fixation hole 11 is formed on the thin segment 14 and the coupling 2 is sheathed on the thin segment 14; a keyway 15 is formed on each of the thin segment 14 and the coupling body 28; and the coupling 2 is limited between the stopper 6 and the thick segment 13 of the output shaft 1. The key 20 is a flat key.

A convex bulge 43, which is extended towards a circumferential outer side, is formed at an end, which is away from the first positioning bulges 41, of the movable sleeve; an inner wall of the movable sleeve 4 is extended outward to form a first escape groove 44 which gives the way to the compression spring 5, and the first escape groove 44 runs through an end, having the convex bulge 43, of the movable sleeve 4. An end, which is away from the movable sleeve 4, of the stopper 6 is extended towards the circumferential outer side to form a convex ring 61; one end of the compression spring 5 is located in the first escape groove 44 and the other end of the compression spring 5 is resisted against an axial end face of the convex ring 61. A second escape groove 62, which is used for receiving the head of the fixation screw 12, is formed on the stopper 6.

When it is necessary to propel the scooter/wheelchair manually, the movable sleeve is pulled outward to offset the elasticity of the compression spring by an external force, and after the first positioning bulges on the movable sleeve are moved from the first positioning grooves and the second positioning grooves, the hub is disengaged from the coupling, that is, the hub is disengaged from the output shaft. Then, the movable sleeve is rotated so that the first positioning bulges are deviated from the second positioning grooves and the second positioning bulges are aligned with the third positioning grooves, and the force applied to the movable sleeve is released. Now, due to the compression spring, the second positioning bulges are fitted in the third positioning grooves. Now, the position of the movable sleeve is thus maintained. Since a gap is formed between the external segments of the first positioning bulges and the axial face of the fitting bulge on the hub holder, the movable sleeve will not come into contact with the hub. Therefore, the rotation of the hub is not limited, so it is convenient to propel the scooter/wheelchair manually. It is easier to propel the scooter/wheelchair. The mechanism of the present invention can disengage the hub from the output shaft, so that the rotation of the hub will not drive the output shaft to rotate and the output shaft will not rotate to result in damping. Therefore, the rotation of the hub is easier.

When it is necessary to drive the scooter/wheelchair, the hub is rotated so that each of the first positioning grooves is communicated with one second positioning groove; a force is applied to the movable sleeve so that the first positioning bulges on the movable sleeve are aligned with the first positioning bulges and the second positioning bulges; then, the force is released, and due to the compression spring, the first positioning bulges on the movable sleeve are clamped in the first positioning grooves and the second positioning grooves; when the output shaft rotates, the output shaft drives the coupling to rotate, the walls of the second positioning grooves are resisted against the first positioning bulges to drive the first positioning bulges to rotate, and then the first positioning bulges are resisted against the walls of the first positioning grooves to realize linkage of the output shaft and the hub.

The present invention can disengage the hub from the output shaft, which is convenient to propel the scooter/wheelchair manually.

The invention claimed is:

1. A mechanism for disengaging a hub from an output shaft of a motor, characterized in that an output end of the output shaft is extended out of the motor; a coupling is fixedly sheathed on the output end of the output shaft; a hub, a movable sleeve and a compression spring are sheathed on the coupling; a stopper is fixed at an end of the output end of the output shaft; the compression spring is limited between the stopper and the movable sleeve; the hub has a central hub hole by which the hub is sheathed on the coupling; a plurality of first positioning grooves, which are arranged circularly and uniformly spaced apart from each other, are formed on an inner edge of the hub; a coupling bulge is provided in the circumference of the coupling, and a plurality of second positioning grooves, which are arranged circularly and uniformly spaced apart from each other, are formed on the coupling bulge; a plurality of first positioning bulges, which are arranged circularly and uniformly spaced apart from each other, are provided on the movable sleeve; when the hub is sheathed on the coupling, an axial end face, which is close to the side of the stopper, of the coupling bulge is on an outer side of the central hub hole; when the hub is rotated to correspond the first positioning grooves and the second positioning grooves one by one and to communicate the first positioning grooves with the second positioning grooves, due to the compression spring, the first positioning bulges on the movable sleeve are clamped in the first positioning grooves and the second positioning grooves; and when the first positioning bulges on the movable sleeve come into contact with the axial end face of the coupling bulge, a gap is formed between the first positioning bulges and the inner edge of the hub.

2. The mechanism for disengaging a hub from an output shaft of a motor according to claim 1, characterized in that each of the first positioning bulges comprises an internal segment fitted with the first positioning grooves and an external segment fitted with the second positioning grooves, and a second positioning bulge is provided on an axial end face of the external segment of the first positioning bulge; and third positioning grooves fitted with the second positioning bulges are formed on the coupling bulge of the coupling, and each of the third positioning grooves is located between two adjacent second positioning grooves.

3. The mechanism for disengaging a hub from an output shaft of a motor according to claim 1, characterized in that the axial end face of the output end of the output shaft is recessed inward to form a fixation hole, a threaded end of a fixation screw is fitted in the fixation hole by threads, and the fixation hole, the fixation screw and the output shaft are arranged coaxially; and the stopper is sheathed on the fixation screw, and the stopper is limited between the axial end face of the output shaft and a head of the fixation screw.

4. The mechanism for disengaging a hub from an output shaft of a motor according to claim 3, characterized in that the coupling is fitted with the output shaft by a key; the output end of the output shaft comprises a thick segment and a thin segment to form a stepped structure; the fixation hole is formed on the thin segment and the coupling is sheathed on the thin segment; a keyway is formed on each of the thin segment and the coupling; and the coupling is limited between the stopper and the thick segment of the output shaft.

5. The mechanism for disengaging a hub from an output shaft of a motor according to claim 1, characterized in that the hub comprises a hub body and a hub holder; the hub body is fixed on the hub holder by a fastener; the hub holder comprises a first holder portion sheathed on the coupling and a second holder portion on the first holder portion; a process hole for fitting with the fastener is formed on each of the second holder portion and the hub body; the central hub hole is formed on the first holder portion; a through hole for allowing the first holder portion to pass through is formed on the hub body; the first positioning grooves are arranged on an axial face of the first holder portion; a retainer ring is provided on the output shaft or the coupling; and the hub holder is limited between the retainer ring and the movable sleeve.

6. The mechanism for disengaging a hub from an output shaft of a motor according to claim 5, characterized in that the second holder portion is formed at an end of the first holder portion away from the motor, and the hub body is located between the second holder portion and the motor.

7. The mechanism for disengaging a hub from an output shaft of a motor according to claim 1, characterized in that the central hub hole comprises a first central hole segment and a second central hole segment, and the first central hole segment has a diameter greater than that of the second central hole segment; and when the hub is sheathed on the coupling, the coupling is fitted in the second central hole segment, and the coupling bulge of the coupling is located in the first central hole segment.

8. The mechanism for disengaging a hub from an output shaft of a motor according to claim 1, characterized in that a circular fitting bulge is formed on an inner edge of an axial end face, which is close to the movable sleeve, of the hub; the first positioning grooves are arranged on the fitting bulge, and the first positioning grooves run through a circumferential outer wall and a circumferential inner wall of the fitting bulge; and when the first positioning bulges are resisted against the axial end face of the coupling bulge, a gap is formed between the first positioning bulges and the axial end face of the fitting bulge.

9. The mechanism for disengaging a hub from an output shaft of a motor according to claim 1, characterized in that a convex bulge, which is extended towards a circumferential outer side, is formed at an end, which is away from the first positioning bulges, of the movable sleeve; an inner wall of the movable sleeve is extended outward to form a first escape groove which gives the way to the compression spring, and the first escape groove runs through an end, having the convex bulge, of the movable sleeve; an end, which is away from the movable sleeve, of the stopper is extended towards the circumferential outer side to form a convex ring; one end of the compression spring is located in the first escape groove and the other end of the compression spring is resisted against an axial end face of the convex ring.

10. The mechanism for disengaging a hub from an output shaft of a motor according to claim 1, characterized in that the coupling comprises a coupling body; the coupling bulge comprises a plurality of individual coupling bulges, which are arranged circularly and uniformly spaced apart from each other on the circumferential outer side of the coupling body; the second positioning grooves are located between two adjacent individual coupling bulges; when the hub is sheathed on the coupling body, an axial end face, which is close to the side of the stopper, of the individual coupling bulge is located on an axial side of an axial face of the inner edge of the hub; and an oil tank is provided on the coupling body, and the oil tank comprises circular tanks on two sides and a spiral groove between the two circular tanks.

11. The mechanism for disengaging a hub from an output shaft of a motor according to claim 4, characterized in that the hub comprises a hub body and a hub holder; the hub body is fixed on the hub holder by a fastener; the hub holder comprises a first holder portion sheathed on the coupling and a second holder portion on the first holder portion; a process hole for fitting with the fastener is formed on each of the second holder portion and the hub body; the central hub hole is formed on the first holder portion; a through hole for allowing the first holder portion to pass through is formed on the hub body; the first positioning grooves are arranged on an axial face of the first holder portion; a retainer ring is provided on the output shaft or the coupling; and the hub holder is limited between the retainer ring and the movable sleeve.

12. The mechanism for disengaging a hub from an output shaft of a motor according to claim 4, characterized in that the central hub hole comprises a first central hole segment and a second central hole segment, and the first central hole segment has a diameter greater than that of the second central hole segment; and when the hub is sheathed on the coupling, the coupling is fitted in the second central hole segment, and the coupling bulge of the coupling is located in the first central hole segment.

13. The mechanism for disengaging a hub from an output shaft of a motor according to claim 4, characterized in that a circular fitting bulge is formed on an inner edge of an axial end face, which is close to the movable sleeve, of the hub; the first positioning grooves are arranged on the fitting bulge, and the first positioning grooves run through a circumferential outer wall and a circumferential inner wall of the fitting bulge; and when the first positioning bulges are resisted against the axial end face of the coupling bulge, a gap is formed between the first positioning bulges and the axial end face of the fitting bulge.

\* \* \* \* \*